(No Model.)

J. S. EDDY.
STEEL SPRING TIRE.

No. 530,888. Patented Dec. 11, 1894.

Witnesses
M. Hampton Lloyd
Edward P. Wish

John Stevens Eddy
Inventor

UNITED STATES PATENT OFFICE.

JOHN STEVENS EDDY, OF DENVER, COLORADO, ASSIGNOR OF ONE-HALF TO MILTON SMITH, OF SAME PLACE.

STEEL-SPRING TIRE.

SPECIFICATION forming part of Letters Patent No. 530,888, dated December 11, 1894.

Application filed June 2, 1894. Serial No. 513,288. (No model.)

*To all whom it may concern:*

Be it known that I, JOHN STEVENS EDDY, a citizen of the United States, residing at Denver, in the county of Arapahoe and State of Colorado, have invented a new and useful Steel-Spring Rubber-Covered Tire, to be known as the Eddy-Smith Steel-Spring Rubber-Covered Tire, of which the following is a specification.

My invention relates to an entirely new and novel construction of the tire for the wheels of bicycles, buggies and other vehicles, consisting of a series of flat circular steel springs placed side by side and held together by two flat steel bars or straps or strips, riveted upon the inside (above and below) of said circular springs, constituting a perfectly circular formed figure; which said figure is surrounded by a rubber covering thereby forming a perfect tire; the tire having an elastic and flexible movement while in use, similar to that of the pneumatic tire now used in and upon bicycle wheels. The said tire is to be fastened upon the usual and ordinary rim in use in the construction of wheels for bicycles and other vehicles. I attain these objects by the mechanism illustrated in the accompanying drawings, in which—

Figure 1:
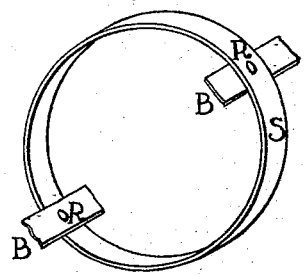
Figure 2:
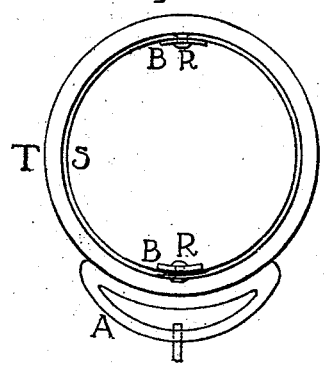
Figure 3:
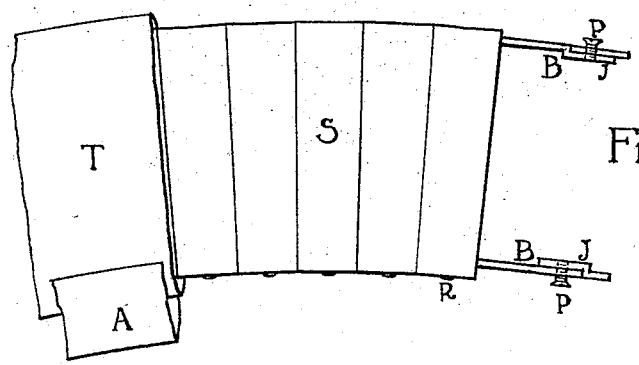
Figure 4:
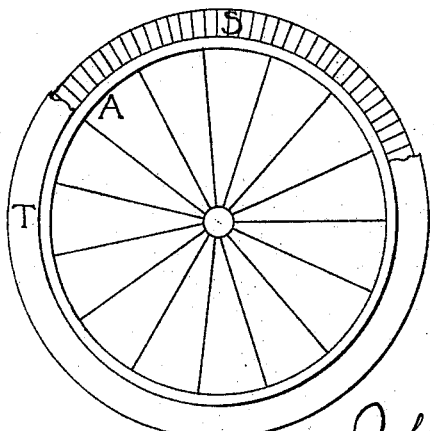

Figure 1 is a perspective view in detail of one of the steel springs S, with the two bars, or straps or strips B, to which the spring is fastened by the rivet R. Fig. 2 is a section in detail through the tire and rim of the wheel, showing an end view of one of the springs S, and a section of the two bars or straps B, to which the springs are riveted by rivets R, and surrounded by the rubber covering T. Fig. 3 is a side view in detail of the tire and rim of the wheel, which is broken off to show several of the springs S, which in turn are left off to show the two bars or straps B, which run around inside the steel springs S to hold them together; and also shows the manner of fastening the bars B to each other to complete the circular figure by means of a screw P. Fig. 4 is a general view of a bicycle wheel with the outside rubber covering partly broken off and showing the springs S underneath.

Similar letters refer to similar parts throughout the several views.

The steel spring S is a piece of flat steel bent in the form of a ring and either lapped or brased at the ends; the width of which piece of flat steel gradually narrows as it approaches the point on the circumference of said ring intended to be placed nearest the rim and hub of the wheel.

The steel bar or strap B is a flat piece of steel to be placed (above and below) on the inside of each and every circular spring and to which each individual circular spring is riveted above and below. The word "above" is used to designate the part of the circular spring farthest from the rim and hub of the wheel, and "below" to designate the part of the circular spring nearest to the rim and hub of the wheel.

R. is the rivet by which the circular springs S are riveted to the bars or straps B to hold the springs in place; the head of which rivet R is sunk into the outer surface of the circular spring S so as to form a perfectly smooth outer surface which comes in contact with the rubber covering.

By placing the edges of the circular springs S together the bevel is such as to form a perfect joint, and by placing together the whole number of springs to be used in each tire, the bevel is such as to form a circular cylindrical figure. The piece of flat steel constituting the ring may be brased, welded or lapped at the joint next the rim of the wheel. The width and thickness of both the circular springs S and the bars or straps B can vary in proportion to the amount of strength required to carry the weight desired.

The ends of the bars or straps B are united to obtain the circular cylindrical figure by an overlapping joint J, in which the one end of the bar B is straight and the other end is made in the form of an elbow so as to make the outer surface of the joint perfectly smooth. The hole in which the screw turns is threaded, and on the under side the bar or strap at that point enlarged so as to have a sufficiency of body in which the screw may turn, and extends into or through the ends of the overlapping bars or straps B. The screw P is sunk into the outer surface of the spring S so as to form a perfectly smooth outer surface which comes in contact with the rubber covering.

This mechanism when its parts are put together will constitute a perfect circular cylindrical spring; which spring will receive more or less support from the rubber covering surrounding it, and which covering should be slit its entire length on the inside, that is, the portion thereof coming next to the rim or hub of the wheel, and closely laced around the springs, or in any other manner in which the rubber can be closely and securely placed around the said springs. This tire may then be sprung upon or into the rim of the wheel and cemented or otherwise securely fastened thereto.

Having thus described my invention, what I claim is—

1. A tire for bicycles and other vehicles, consisting in combination, of a series of independent, circular, flat metal springs arranged in contact, bars B, uniting said springs above and below, said springs fastened independently to said bars, the ends of each bar connected by a screw P, the whole having an outside rubber covering, T, substantially as described.

2. A tire for bicycles and other vehicles, consisting in combination, of a series of independent, circular flat metal spring rings arranged in contact, cross bars B, uniting said circular rings at opposite points above and below, each of said circular rings independently secured to said bars, the whole having a rubber covering, T, substantially as described.

JOHN STEVENS EDDY.

Witnesses:
M. HAMPTON LLOYD,
EDWARD F. WIST.